US00RE47139E

(19) United States
(12) Reissued Patent
Katopo et al.

(10) Patent Number: US RE47,139 E
(45) Date of Reissued Patent: Nov. 27, 2018

(54) PACKAGING

(71) Applicant: Medline Industries, Inc., Mundelein, IL (US)

(72) Inventors: Juniwati Katopo, Elgin, IL (US); Ava K. Wilson, Chicago, IL (US); Brian Palmer, Highwood, IL (US); Emily Somers, Cary, IL (US)

(73) Assignee: MEDLINE INDUSTRIES, INC., Mundelein, IL (US)

(21) Appl. No.: 29/638,073

(22) Filed: Feb. 23, 2018

Related U.S. Patent Documents

Reissue of:
(64) Patent No.: Des. 749,945
Issued: Feb. 23, 2016
Appl. No.: 29/499,169
Filed: Aug. 12, 2014

U.S. Applications:
(62) Division of application No. 29/449,752, filed on Mar. 15, 2013, now Pat. No. Des. 710,687.

(51) LOC (11) Cl. ..... 09-03
(52) U.S. Cl.
USPC ..... D9/432
(58) Field of Classification Search
USPC ..... D9/430–434, 414, 417, 418, 420–424, D9/427, 707–708; D3/272, 273, 294, D3/302, 304, 315; D7/601, 602, 612
CPC ..... B65D 5/00; B65D 5/0209; B65D 5/029; B65D 5/40; B65D 5/72; B65D 5/727
See application file for complete search history.

(56) References Cited

U.S. PATENT DOCUMENTS

D357,861 S * 5/1995 Sawa et al. ..... D9/432
D379,759 S * 6/1997 Mulry ..... D9/416
D391,481 S * 3/1998 Oxley ..... D9/432
D396,806 S * 8/1998 Burke et al. ..... D9/432
D460,689 S * 7/2002 Robinson ..... D9/416
D552,984 S * 10/2007 Baron ..... D9/418
D608,636 S * 1/2010 Seol ..... D9/432
8,061,587 B2 * 11/2011 Blin ..... B65D 5/542 206/427
D651,097 S * 12/2011 Charles ..... D9/721
(Continued)

*Primary Examiner* — Darlington Ly
(74) *Attorney, Agent, or Firm* — McAndrews, Held & Malloy, Ltd.

(57) CLAIM

The ornamental design for packaging, as shown and described.

DESCRIPTION

FIG. 1 is a front perspective view of packaging showing our new design;
FIG. 2 is a front elevation view thereof;
FIG. 3 is a rear elevation view thereof;
FIG. 4 is a right side elevation view thereof;
FIG. 5 is a left side elevation view thereof;
FIG. 6 is a top plan view thereof; and,
FIG. 7 is a bottom plan view thereof.
The stippled areas represent areas of contrasting appearance to the adjacent non-stippled areas.
The dotted lines shown in FIGS. 1 and 4 represent perforations and form no part of the claimed design.
The vertical and horizontal shade lines in the figures are used to show that the surfaces are substantially planar and not to be interpreted as surface ornamentation.
*The even-length dashed broken line rectangles in FIGS. 1 to 6 illustrate portions of the packaging that form no part of the claimed design.*

1 Claim, 4 Drawing Sheets

Figure 7:
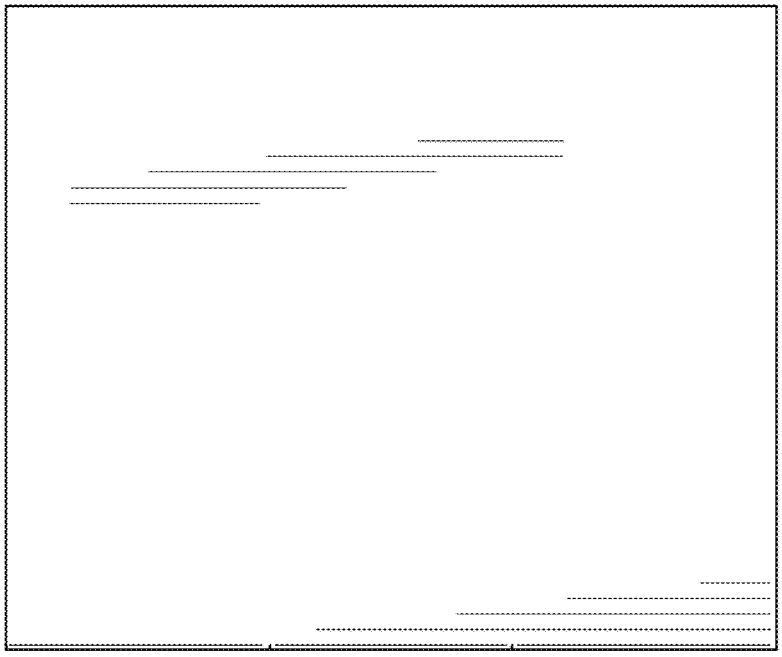

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D675,521 | S | * | 2/2013 | Gregory et al. | D9/434 |
| D680,862 | S | * | 4/2013 | Thompson et al. | D9/432 |
| D684,467 | S | * | 6/2013 | Macaulay et al. | D9/432 |
| 8,453,919 | B2 | * | 6/2013 | Eckermann | B65D 71/36 229/117.13 |
| D710,215 | S | * | 8/2014 | Palmer et al. | D9/734 |
| D710,687 | S | * | 8/2014 | Katopo | D9/432 |
| D714,137 | S | * | 9/2014 | Katopo et al. | D9/433 |
| D721,956 | S | * | 2/2015 | Katopo | D9/630 |
| D722,265 | S | * | 2/2015 | Katopo et al. | D9/630 |
| D740,652 | S | * | 10/2015 | Makhsudova | D9/418 |
| D741,710 | S | * | 10/2015 | Katopo | D9/433 |
| D749,945 | S | * | 2/2016 | Katopo | D9/432 |
| D758,181 | S | * | 6/2016 | Lutz | D9/416 |
| D760,072 | S | * | 6/2016 | Lutz | D9/416 |
| D764,271 | S | * | 8/2016 | Sanfilippo | D9/416 |
| D764,903 | S | * | 8/2016 | Sanfilippo | D9/416 |
| D772,060 | S | * | 11/2016 | O'Dowd | D9/432 |
| D772,061 | S | * | 11/2016 | O'Dowd | D9/432 |
| D784,806 | S | * | 4/2017 | Gasior | D9/432 |
| D794,441 | S | * | 8/2017 | Boston | D9/414 |
| D794,442 | S | * | 8/2017 | Boston | D9/414 |
| D798,140 | S | * | 9/2017 | Frick | D9/414 |
| D798,702 | S | * | 10/2017 | Boston | D9/414 |
| D798,704 | S | * | 10/2017 | Hainaut | D9/418 |
| D801,799 | S | * | 11/2017 | Boston | D9/414 |
| D807,165 | S | * | 1/2018 | Lyle | D9/414 |
| D807,166 | S | * | 1/2018 | Lyle | D9/414 |
| D813,030 | S | * | 3/2018 | Powers | D9/434 |
| D813,666 | S | * | 3/2018 | Habig | D9/432 |

* cited by examiner

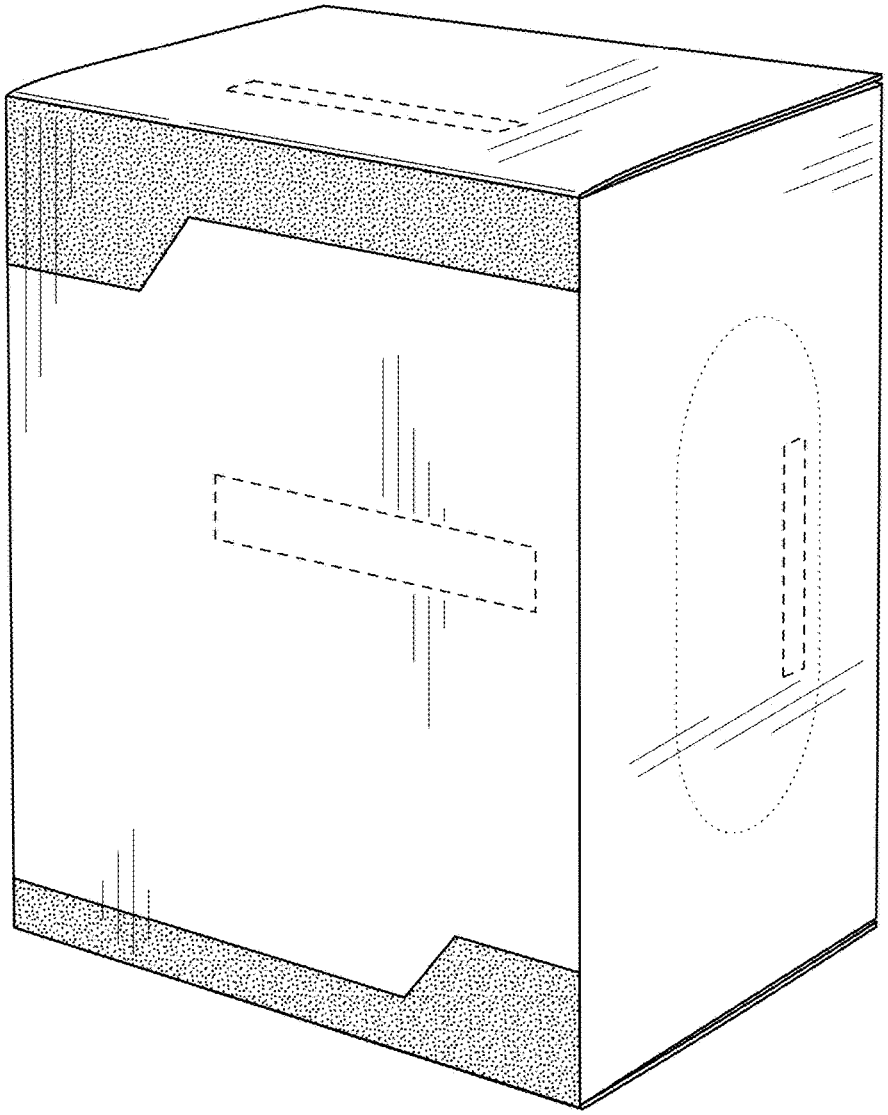
FIG. 1
(AMENDED)

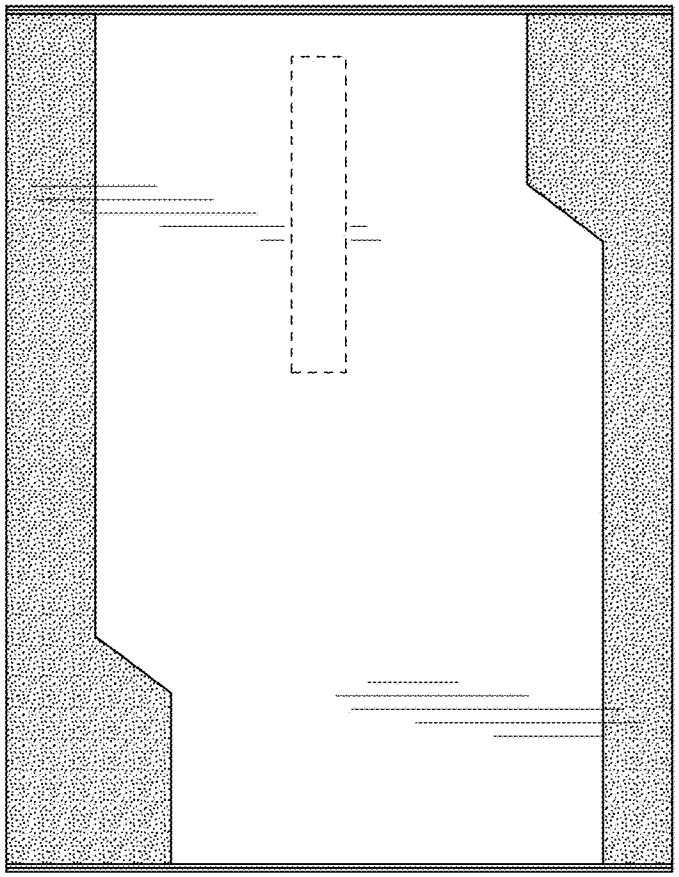
FIG. 3
(AMENDED)
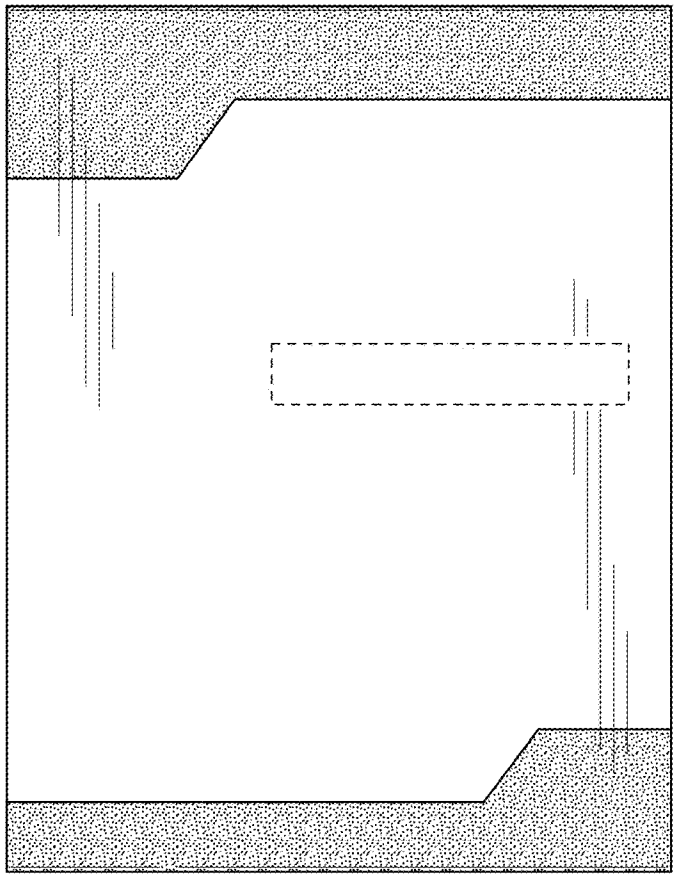
FIG. 2
(AMENDED)

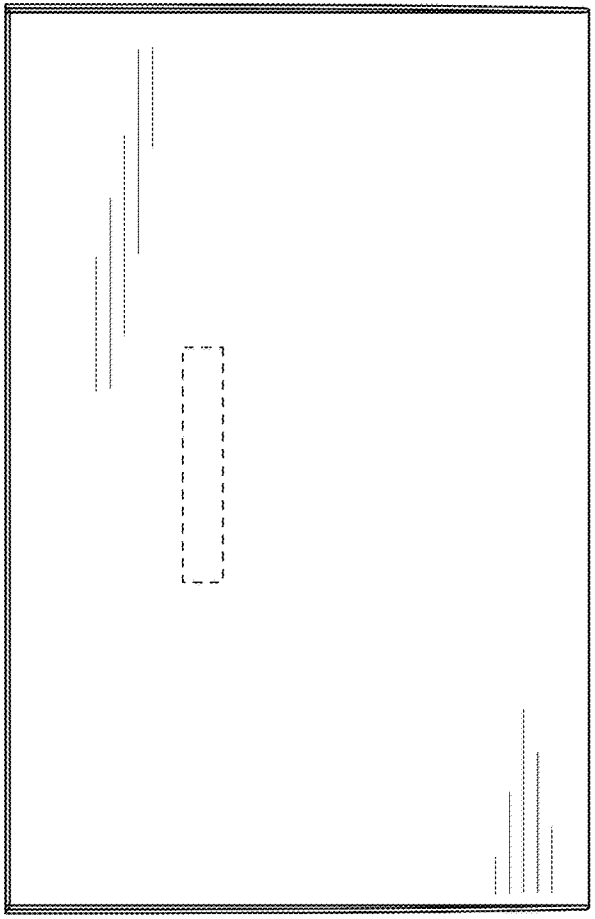
FIG. 5
(AMENDED)
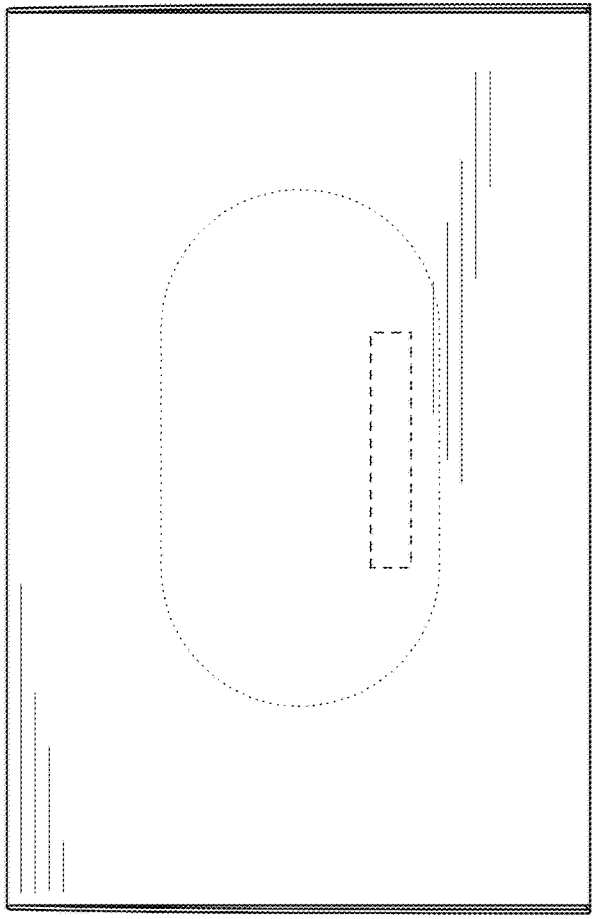
FIG. 4
(AMENDED)

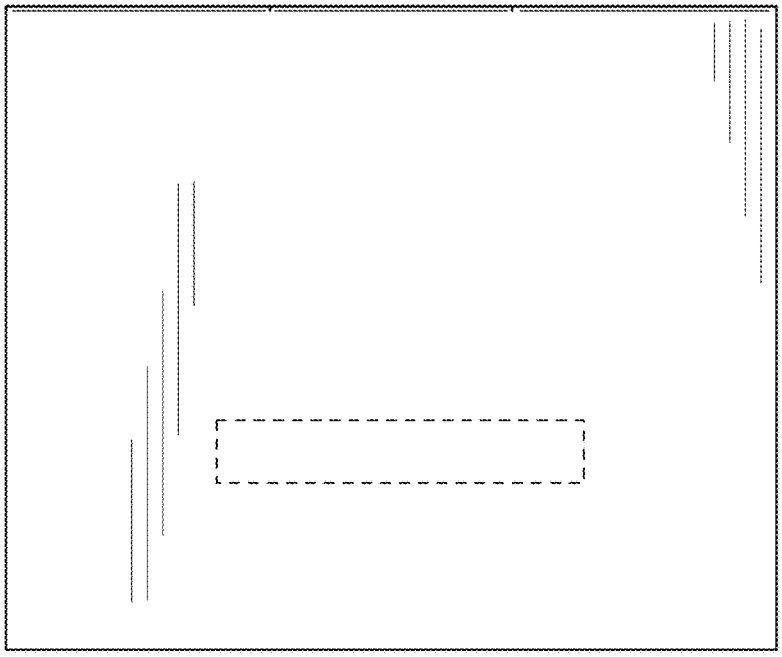
FIG. 6
(AMENDED)